United States Patent [19]

Hauberg et al.

[11] 4,281,024
[45] Jul. 28, 1981

[54] METHOD FOR SPRAY DRYING LIQUID PRODUCTS

[75] Inventors: Georg H. H. Hauberg, Allerod; Jens Krag, Copenhagen; Jan Pisecky, Taastrup, all of Denmark

[73] Assignee: Aktieselskabet Niro Atomizer, Soborg, Denmark

[21] Appl. No.: 99,508

[22] Filed: Dec. 3, 1979

Related U.S. Application Data

[60] Continuation of Ser. No. 925,846, Jul. 18, 1978, abandoned, which is a division of Ser. No. 837,876, Sep. 29, 1977, abandoned.

[30] Foreign Application Priority Data

Sep. 30, 1976 [DK] Denmark .............................. 4416/76

[51] Int. Cl.³ .............................................. A23C 1/04
[52] U.S. Cl. ...................................... 426/471; 34/32; 159/4 MS; 426/521; 426/522
[58] Field of Search ............... 426/471, 521, 522, 588, 426/585, 583, 599, 285, 453; 34/57 D, 9, 32, 79; 159/4 R, 16 R, 4 GC, 16 S, 48 R, DIG 2, DIG. 11, 4 MS, 17 VS; 55/257 C, 89, 228, 238, 237; 422/307

[56] References Cited

U.S. PATENT DOCUMENTS

3,065,076  11/1962  Wenner et al. ...................... 426/471

OTHER PUBLICATIONS

Arsdel, Food Dehydration, The AVI Pub. Co. Inc., Westport, CT, 1973, pp. 317, 318, 320, 321 and 323–325.
Spicer, Advances in Preconcentration and Dehydration of Food, Applied Science Pub., Ltd., London, 1974, pp. 321–325, 343–346 and 351.
Hall, Milk Pasteurization, The AVI Pub. Co. Inc., Westport, CT, 1968, pp. 82–84.
Parker et al., Elements of Food Engineering, vol. 3, Reinhold Pub. Co., New York, 1954, pp. 65 and 66.

*Primary Examiner*—Joseph M. Golian
*Assistant Examiner*—George C. Yeung
*Attorney, Agent, or Firm*—Dennison, Meserole, Pollack & Scheiner

[57] ABSTRACT

The invention relates to a method for spray drying perishable liquid products such as milk products. The exhaust gas from the spray dryer is passed through a gas scrubber in which at least part of the liquid product to be dried is used as washing liquid before spraying it into the spray drying chamber of the spray dryer. Prior to passing it into the gas scrubber the washing liquid is heated to a pasteurizing temperature by suitable heating means. These heating means may, for example, be adapted to inject hot steam into the flow of washing liquid, or the heating means may be in the form of an evaporator connected to the spray dryer at the upstream side thereof.

10 Claims, 2 Drawing Figures

METHOD FOR SPRAY DRYING LIQUID PRODUCTS

This is a continuation of application Ser. No. 925,846, filed July 18, 1978, now abandoned, which application is a division of application Ser. No. 837,876, filed Sept. 29, 1977 now abandoned.

BACKGROUND OF THE INVENTION

1. Field of the Invention

The present invention relates to a method for spray drying perishable liquid products, for example milk products, such as skim milk and whey.

2. Description of the Prior Art

The exhaust gas form, a spray dryer normally entrains part of the dried powdered or particulate product and therefore this exhaust gas has to be cleaned before it is exhausted into the atmosphere. This cleaning may, for example, be made by means of a cyclone. However, cleaning by means of a cyclone is quite often not sufficient in consideration of environmental requirements and—when the dried product is rather valuable—not from an economical point of view either.

It is known to further clean the exhaust gas from a spray dryer by passing it through a gas scrubber in which the liquid product which is later to be dried in the spray dryer is used as washing liquid. Thereby it is obtained not only that the product entrained in the exhaust gas of the spray dryer is recovered, but also a heat economical advantage is obtained because before being exhausted into the atmosphere the said exhaust gas will give up part of its remaining heat energy and thereby preheat or concentrate the liquid product which is later supplied to the spray dryer.

In connection with spray drying of milk it has been proposed to use milk in a cold condition, for example at a temperature which is 35°–40° C. below the wet bulb temperature of the exhaust gas. As described in the following such method will, however, not only create serious hygienic problems due to bacterial growth in the gas scrubber system, but the said known method is also uneconomic. The washing liquid introduced into the scrubber will namely always leave the scrubber at a temperature which is adjacent to the wet bulb temperature of the exhaust gas, and because the washing liquid is passed to the scrubber in a cold condition as mentioned above a relatively great amount of the heat energy in the exhaust gas will be used for heating the washing liquid and not for evaporating the same which means that evaporation in the scrubber is reduced.

In connection with spray drying of milk products it is common practice to concentrate the milk products before spray drying, for example in a multistage evaporator. In such known apparatus the washing liquid for the gas scrubber is derived from a supply conduit for the liquid milk product somewhere upstream of the evaporator.

In a known spray drying plant for spray drying of skim milk it has been proposed to use a heat exchanger to exchange heat between the milk supplied to the gas scrubber as washing liquid and the washing liquid leaving the scrubber. In this known plant the milk is supplied to the scrubber system at a temperature of 8° C. and heated to about 38° C. in the heat exchanger. In the scrubber itself the milk takes up part of the remaining heat energy in the exhaust gas from the spray dryer whereby the milk becomes concentrated and further heated to about 42° C. while the milk leaving the gas scrubber passes through the heat exchanger and is thereby cooled from the said temperature to about 10° C. This known plant is described in the Danish periodical Nordeuropaeisk Mejeritidsskrift No. 8 (1975). In the description of this known plant it is pointed out that the temperature at which the milk used as washing liquid is introduced into the gas scrubber is the ideal temperature for bacterial growth. It is maintained, however, that the residence time in the scrubber may be made so short that the inevitable increase in the number of bacteria will not be of substantial importance.

However, experience with the above known method seem to show that it is rather doubtful whether bacterial growth can be suppressed.

Before supporting this statement some bacteriological aspects in connection with conventional production of milk powder by spray drying will be briefly explained. The production in a milk powder factory is normally based on milk supplied from several dairies. In these dairies the raw milk is usually subjected to a pasteurizing treatment—often in connection with cleaning and fat separation—before the milk is sent to the milk powder factory. In case the milk powder factory receives raw milk or milk of poor bacteriological quality this milk will normally be subjected to a pasteurizing treatment upon arrival to the factory. However, during the subsequent storing and treatment of the milk a risk of contamination and bacterial growth will nevertheless exist, and this bacterial growth may even be explosion-like if favourable conditions for bacterial growth exist.

This is mainly due to two facts. Firstly, the natural bactericidal substances present in raw milk are destroyed by the pasteurizing process. Secondly, a phenomenon called "fouling" occurs in apparatuses and plants for treatment of milk. This phenomenon is due to the fact that extremely thin deposits in which bacterial growth may take place are formed on the apparatus surfaces getting in contact with the milk being treated. Therefore, normally it is tried to minimize the time period in which the temperature of the milk is within the range of temperatures most favourable to bacterial growth (normally 30°–50° C.) and to minimize the apparatus surfaces getting in contact with the milk while being within the critical temperature range. When milk is treated in the known apparatus or plant described above the milk passes the critical temperature range no less than three times, namely when the milk is supplied to the gas scrubber, when it is passed from the scrubber, and in the evaporator to which the milk is supplied from the scrubber. Therefore, it is unavoidable that the known apparatus or plant described presents great possibilities for bacterial growth. Of course, similar conditions exist in connection with spray drying of whey and other perishable liquid products.

In some countries the quality requirements to dried milk products are very strict and the unavoidable increase in the bacteria number in the known plants or apparatuses described above results in generation of lactic acid implying a determinable and in certain cases unacceptable deterioration of the finished product.

SUMMARY OF THE INVENTION

The present invention provides a method of the above type permitting substantial reduction of unwanted bacterial growth in the scrubber system.

The method according to the invention comprises spraying said liquid product into a spray drying chamber, supplying drying gas into said spray drying chamber, passing exhaust gas phase from said spray drying chamber into a gas scrubber to remove solid particles from said gas phase, and heating at least part of said liquid product to a pasteurization temperature and immediately thereafter using said pasteurized liquid product as washing liquid in said gas scrubber before spraying it into said spray drying chamber. The said heating of the liquid product which may be performed in any suitable manner, for example by means of a heat exchanger of any type, causes that the major part of the bacteria are killed or at least totally or partly inactivated.

If the washing liquid is introduced into the scrubber at a temperature which is substantially higher than the wet bulb temperature of the exhaust gas the temperature of the exhaust gas when leaving the scrubber will be higher than if the washing liquid is supplied to the scrubber at a temperature about the wet bulb temperature. Even though this measure gives rise to a certain loss of energy together with the exhaust gas the said measure may be economically attractive because in return an increase of the evaporation in the scrubber is obtained and, furthermore, the heating of the washing liquid may relatively cheaply take place in an evaporator in which the liquid to be spray dried is evaporated or concentrated prior to the spray drying itself. However, the washing liquid may alternatively after heating thereof to a pasteurization temperature, but before it is introduced into the scrubber, be cooled, for example by means of a heat exchanger, and the heat energy derived from the washing liquid may then be used for other heating purposes.

The pasteurization temperature to which a washing liquid is to be heated depends on the demands made to the quality of the finished product, the quality of the liquid product to be spray dried, and the time period in which the liquid product is maintained at the pasteurization temperature, because the efficiency of the pasteurization is determined by a combination of the pasteurization temperature and the pasteurization time period.

Experiments by which the bacteria counts were taken have shown that a pasteurization which is sufficiently efficient to prevent bacterial growth in the scrubber system for milk qualities normally used may be obtained by a heat treatment of the milk at 85° C. in 15 seconds, or by a corresponding combination of temperature and time. For the sake of denaturation of the whey proteins a heat treatment at high temperature and in a short period of time, a so-called HTST-treatment (high temperature, short time) should be aimed at.

As indicated above the liquid product to be spray dried is normally passed through a multistage evaporator which includes a preheater and which is connected upstream of the spray dryer. In this preheater the product to be dried is heated relatively quickly from a relatively low storing temperature to a temperature higher or somewhat lower than a pasteurization temperature. In this case the washing liquid to be used in the gas scrubber may advantageously be removed from the evaporator at a suitable location, preferably downstream of the said preheater. Thereby it is obtained that the washing liquid being removed from the evaporator is already heated to a pasteurization temperature or to a temperature in the vicinity of the pasteurization temperature, so that the liquid needs only little additional heating in order to be totally or partly pasteurized.

The washing liquid which has been used in the scrubber may be returned to the evaporator, preferably at substantially the same location as that at which it is removed, and at substantially the same temperature as the temperature at removal. In that case the removal of washing liquid from the evaporator will not cause any disturbance of the temperature conditions within the evaporator, and this is especially advantageous when an existing evaporating and spray drying plant is to be modified so that it may be operated in accordance with the method of the present invention.

The heated liquid removed from the evaporator may then, before it is introduced into the scrubber, be passed through a heat exchanger in which the liquid is cooled by the already used washing liquid coming from the scrubber. The washing liquid may then be introduced into the scrubber at a suitable temperature—i.e. a temperature in the vicinity of wet bulb temperature of the exhaust gas—and the temperature may again be increased before the liquid is returned to the evaporator.

The more rapidly the liquid is heated to a predetermined pasteurization temperature the more efficient is the pasteurization. An especially rapid heating of the washing liquid may be obtained by bringing it in direct contact with a flow of hot steam. Such contact may, for example, be obtained by injecting the steam into a conduit conducting the liquid or by passing the liquid into a steam conducting conduit. A rapid temperature rise is especially important in the range from about 20° C. to about 60° C.

The invention also relates to a spray drying apparatus for spray drying a perishable liquid product containing solid substances, said apparatus comprising a spray dryer having a liquid inlet connected to an atomizing or spraying device, an inlet for drying gas, and an outlet for gas phase, a gas scrubber having a gas inlet communicating with said gas phase outlet of the spray dryer, an inlet for washing liquid, and a liquid outlet, said liquid outlet communicating with the liquid inlet of the spray dryer, and liquid heating means for heating liquid supplied to said gas scrubber through said liquid inlet thereof to a pasteurization temperature.

As explained above the said heating means may totally or partly be constituted by an evaporator comprised by the said apparatus.

BRIEF DESCRIPTION OF THE DRAWINGS

The invention will now be further described with reference to the diagrammatic drawings wherein.

DESCRIPTION OF PREFERRED EMBODIMENTS

Figure 1:
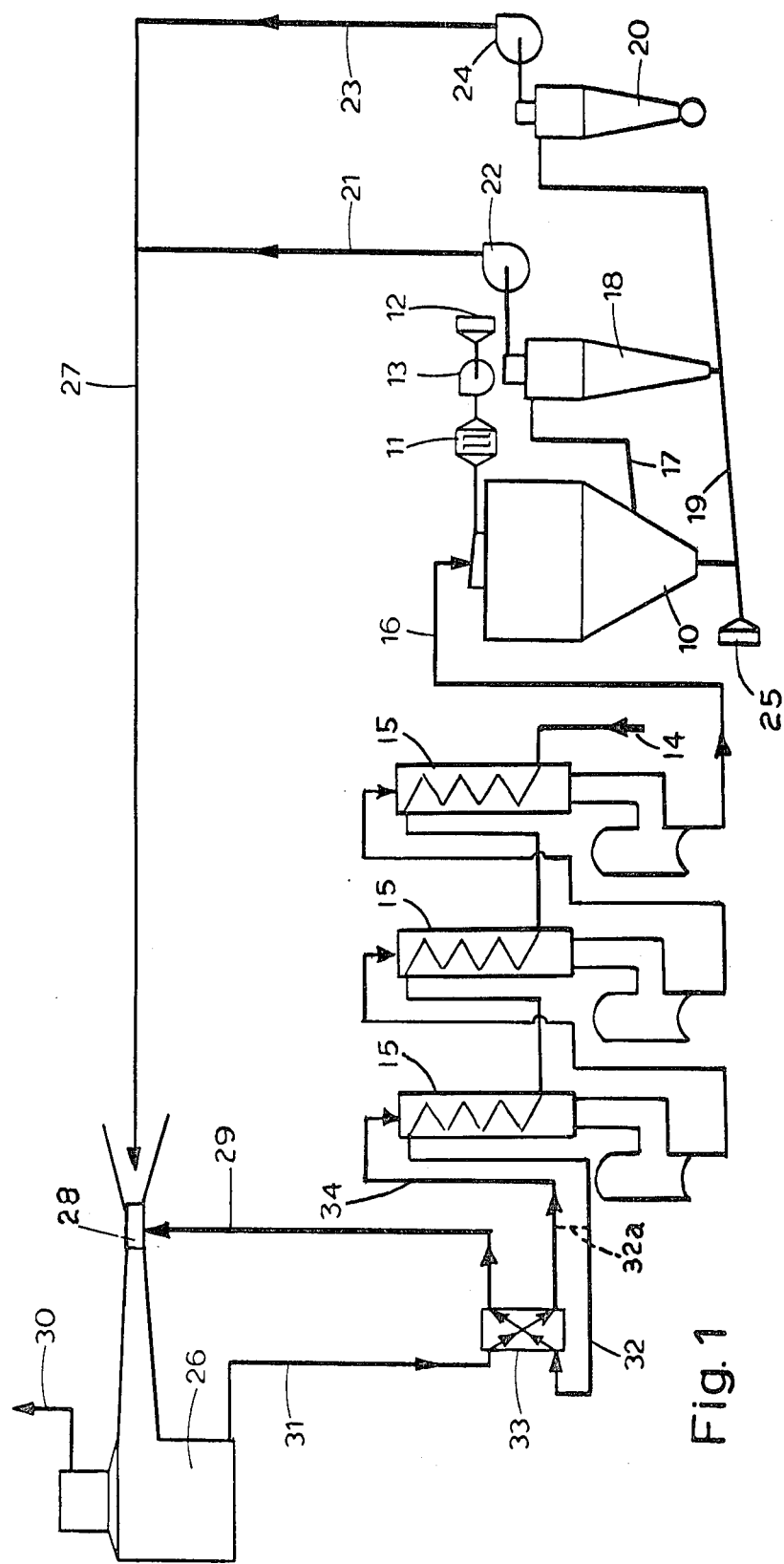
FIG. 1 shows an embodiment of the apparatus for carrying forth the invention.

The apparatuses or plants diagrammatically illustrated in the drawings include a spray dryer 10 to which drying gas or drying air is supplied from an air heater 11 to which fresh air is supplied through a filter 12 by means of a blower 13. The liquid product such as milk or whey to be dried in the spray dryer is supplied through a conduit 14 to an evaporator 15 from a reservoir not shown. This evaporator may be of a known structure and heat may be supplied thereto in a manner not shown, for example in the form of hot steam. In the evaporator 15 the liquid is evaporated or concentrated before it is supplied to the atomizer or spraying device of the spray dryer 10 through a conduit 16. Gas phase is exhausted from the spray dryer 10 through a gas outlet conduit 17 which is connected to a cyclone 18 while the finished dried product from the spray dryer is discharged into a product outlet conduit 19 which is also connected to a cyclone 20. The cyclone 18 has a gas outlet conduit 21 including a blower 22 for sucking the drying gas or air used in the spray dryer out through the cyclone 18 in which the major part of entrained powdered product is separated and passed to the product outlet conduit 19. The cyclone 20 has a gas outlet conduit 23 including a blower 24 for sucking air into the product discharge conduit 19 through a filter 25 in order to convey the product to the cyclone 20 in which the finished powdered product is separated from the conveying air and may be discharged from the apparatus while the conveying air flows out through the gas outlet conduit 23.

The apparatuses or plants shown on the drawings also comprise a gas scrubber 26 which may be of any suitable structure and which is used partly for washing residual entrained dried product out from the exhaust gas from the cyclones 18 and 20, and partly for utilizing the residual heat of the exhaust gas. Therefore, both of the gas outlet conduits 21 and 23 are connected to a gas supply conduit 27 of the scrubber 26, and as shown this gas supply conduit may contain a venturi throat 28 into which a supply conduit 29 for washing liquid opens. The scrubber further comprises an outlet conduit 30 for cleaned and cooled gas opening into the atmosphere, and an outlet conduit 31 for washing liquid enriched by the residual product washed out from the exhaust gas.

In the embodiment shown in FIG. 1 the washing liquid supplied to the scrubber through the supply conduit 29 is removed from the evaporator 15 at a suitable location where the washing liquid has been heated to a pasteurization temperature, for example a temperature of approximately 75° C. which may be obtained downstream of the so-called preheater forming the first stage of the evaporator. The washing liquid removed from the evaporator is passed through a conduit 32 to a heat exchanger 33 and then to the supply conduit 29 of the scrubber. The enriched and cooled washing liquid flowing from the scrubber through the outlet conduit 31 also passes through the heat exchanger 33 and is thereby heated by the washing liquid supplied from the evaporator through the conduit 32 to a temperature which is not substantially lower than that of the liquid supplied from the evaporator. The enriched washing liquid is returned to the evaporator 15 through a conduit 34 at substantially the same location as that at which the liquid was removed, and as the liquid is returned to the evaporator at a temperature which does not substantially differ from the temperature at which the liquid is removed from the evaporator this removal of washing liquid from the evaporator will not to any appreciable extent disturb the temperature conditions in the spray drying apparatus as a whole. The washing liquid supplied to the scrubber through the conduit 29 may either constitute the total liquid flow supplied to the evaporator 15, or part thereof. In FIG. 1 a shunting conduit 32a interconnecting the conduits 32 and 34 is indicated by a dotted line. The desired part of the liquid flowing through the evaporator 15 may then be passed through the scrubber 26 by means of control valves or other control means not shown.

As mentioned above the washing liquid which is removed from the evaporator 15 in order to be introduced into the scrubber 26 is heated to a pasteurization temperature so that bacteria are either killed or more or less inactivated. Furthermore, in the total scrubber system the temperature of the washing liquid may be maintained in the upper zone of or above the temperature range favorable to bacterial growth. This temperature range is normally supposed to be 30°-50° C. Thus, in the scrubber system described it may be avoided that the temperature of the washing liquid used in the scrubber system has to pass the said critical temperature range.

Figure 2:
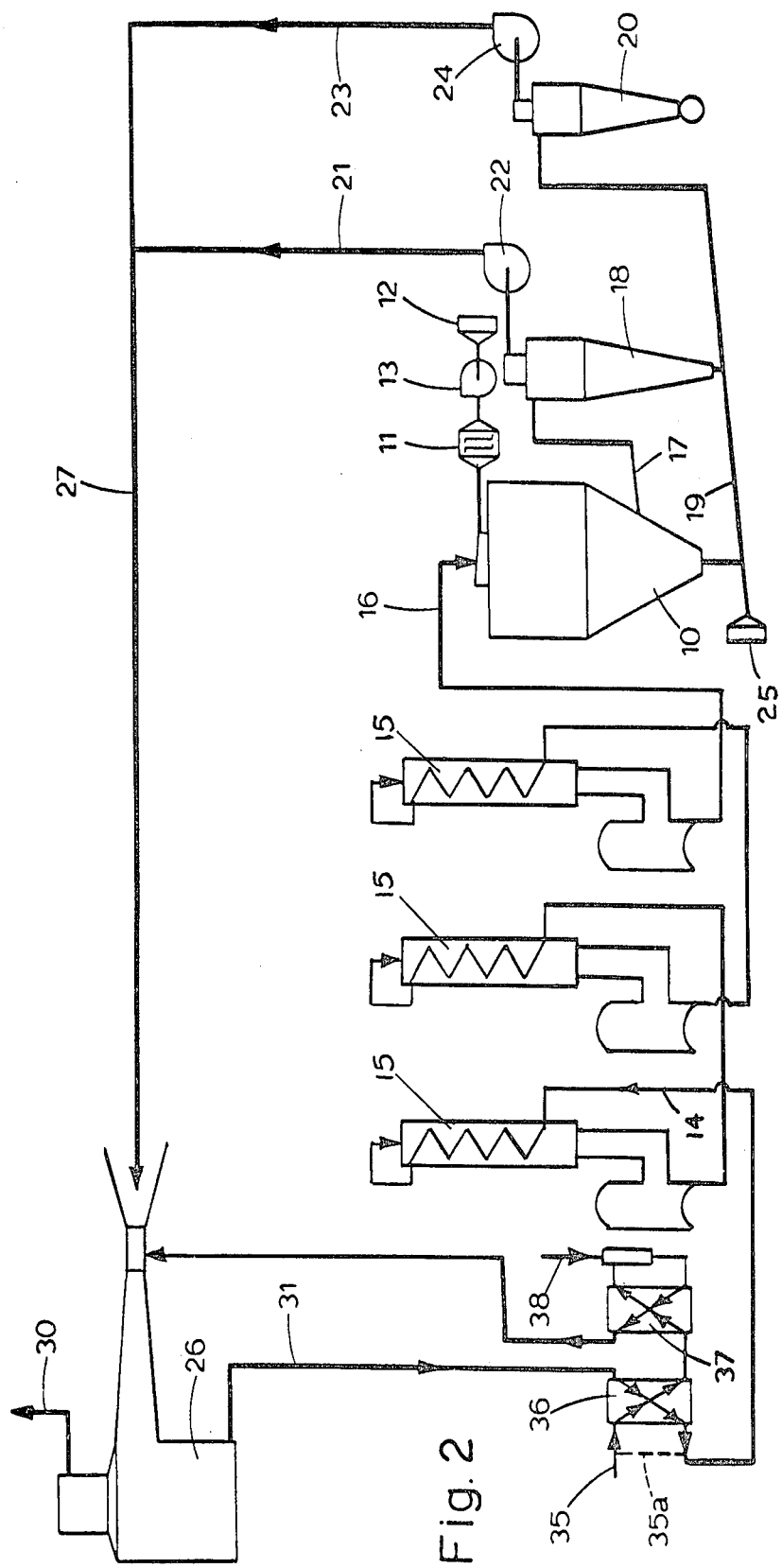
FIG. 2 shows a modified embodiment of the apparatus.

The embodiment shown in FIG. 2 corresponds to that shown in FIG. 1 with the exception that the flow path for the washing liquid supplied to the scrubber 26 has been changed. The liquid product to be treated is supplied to the spray drying apparatus or plant via a conduit 35 and two interconnected heat exchangers 36 and 37, respectively. Hot steam is injected into the liquid conduit downstream of the heat exchanger 37 by means of a steam supply conduit 38 whereby the liquid is rapidly heated to a pasteurization temperature. The heated liquid is returned through the heat exchanger 37 in which the liquid is cooled by giving off some of its heat energy to the colder liquid coming from the heat exchanger 36. Thereafter, the cooled liquid, still at a temperature above or in the upper zone of the temperature range 30°-50° C. that is critical with regard to bacterial growth, flows through the supply conduit to the venturi throat 28 of the scrubber 26. Washing liquid enriched by the residual product separated in the scrubber 26 flows from the scrubber through the outlet conduit 31 back through the heat exchanger 36 where it preheats the colder liquid supplied to the apparatus or plant through the conduit 35. The enriched washing liquid coming from the scrubber 26 is thereby cooled and is then passed through the conduit 14 to the normal liquid inlet of the evaporator 15, through the evaporator, and then to the spray dryer 10 whereby the liquid is concentrated and spray dried, respectively, in a conventional manner previously described. A shunting conduit 35a corresponding to and serving the same purpose as the shunting conduit 32a in FIG. 1 interconnects the conduits 15 and 14.

In the described flow path for scrubber washing liquid it is possible to obtain a quick heating of the washing liquid to a pasteurization temperature and despite that the washing liquid used in the scrubber may be maintained at a suitable temperature level. Furthermore, the enriched washing liquid coming from the scrubber may be supplied to the evaporator at a usual low temperature. That means that it is possible to use a conventional evaporator and spray dryer also in connection with the embodiment shown in FIG. 2 without disturbing the temperature conditions in the apparatus or plant to any objectionable extent.

EXAMPLE 1

Skim milk is evaporated and spray dried in an apparatus or a plant corresponding to that shown in FIG. 1. The milk is supplied to the evaporator 15 through the conduit 14 at a temperature of 6° C. The milk to be used as washing liquid in the scrubber 26 is removed at such a location at the first stage of the evaporator 15 that the temperature of the milk is 72° C. which is a pasteurization temperature. The milk supplied to the venturi throat 28 of the scrubber 26 is passed through the heat exchanger 33 in which the milk is cooled to a temperature of 50° C. Exhaust gas from the spray dryer 10 and conveying air from the conduit 23 is supplied to the scrubber through the conduit 27 at a temperature of 90° C. and is discharged from the scrubber through the conduit 30 at a temperature of 50° C. When the milk has been used as washing liquid in the scrubber 26 it leaves the scrubber through the conduit 31 at a temperature of 45° C., and when on its way back to the evaporator the milk once more passes through the heat exchanger 33 the milk is heated to 67° C. It should be noted that the milk removed from the evaporator has a temperature of 72° C. while the enriched milk returned to the evaporator has a temperature of 67° C. which means that the temperature of the milk has not been changed to such an extent that the temperature change has any appreciable influence on the function of the remaining part of the plant or apparatus. It should also be noticed that the milk used as washing liquid in the scrubber is maintained at a temperature in the upper zone of or above the critical temperature range with regard to bacterial growth, from the time at which the washing liquid is removed from the evaporator till the time at which it is returned thereto. By taking the bacterial count it is ascertained that the bacterial growth in the scrubber system is much less than in a corresponding conventional plant in which the washing liquid is not pasteurized before being introduced into the scrubber.

EXAMPLE 2

Skim milk is evaporated and spray dried in an apparatus or a plant corresponding to that shown in FIG. 2. Fresh milk is supplied through the conduit 35 at a temperature of 6° C. and is heated in the heat exchanger 36 to a temperature of 40° C. while it is further heated in the heat exchanger 37 to a temperature of 70° C. Such amount of hot steam is supplied through the steam supply conduit 38 that the temperature of the milk is further increased to 75° C., i.e. a pasteurization temperature, before the milk is returned through the heat exchanger 37. In the heat exchanger 37 the milk is cooled to a temperature of 45° C. at which temperature the milk is introduced as washing liquid into the venturi throat 28 of the scrubber 26. The temperature of the milk discharged through the conduit 31 is the same as the temperature at which the milk is supplied through the conduit 29, namely 45° C. In the heat exchanger 36 the milk coming from the scrubber 26 is cooled to 10° C. while the fresh cold milk supplied through the conduit 35 is simultaneously heated. The enriched milk flows through the conduit into the evaporator at the said temperature of about 10° C. The gas temperatures in the conduits 27 and 30 are as in example 1. Like in example 1, by taking bacterial count in the scrubber system it is also in the present example ascertained that the bacterial growth in the scrubber system is much less than in conventional apparatuses or plants.

EXAMPLE 3

Experiments have been made in connection with spray drying of milk in a plant or apparatus of the type shown in FIG. 1. Milk supplied to the evaporator 15 through the conduit 14 was heated in the preheater of the evaporator 15 from a temperature of 8° C. to a temperature of 75° C. and further heated to 84° C. by direct supply of hot steam. Based on measurements the time period in which the milk was maintained at that temperature was calculated to 5 seconds. Thereafter the milk was cooled to a temperature of 54° C. in the heat exchanger 33 by means of milk discharged from the scrubber 26. The milk was discharged from the scrubber at a temperature of 48° C. and was thereafter heated to a temperature of 78° C. in the heat exchanger 33 and at this temperature the milk was returned to the evaporator.

It is pointed out that the pasteurization temperature and time used do not fully correspond to the preferred values previously mentioned, namely 85° C. in 15 seconds. The reason is that at the experiments here described it was desired to produce milk powder with a minimum content of denatured whey proteins.

The bacteria counts in milk samples from various locations of the plant were taken (plate count agar).

The results are shown in the following table where "I" refers to samples taken from milk supplied into the preheater of the evaporator while "II" refers to samples taken from milk supplied to the scrubber, and "III" refers to samples of milk leaving the scrubber.

| Experiment No. | Time of operation in hours | Bacteria count per milliliter | | |
|---|---|---|---|---|
| | | I | II | III |
| 1 | 1 | $1.0 \times 10^6$ | $4.6 \times 10^4$ | $7.2 \times 10^4$ |
| 2 | 5 | $8.4 \times 10^6$ | $2.1 \times 10^4$ | $3.3 \times 10^4$ |
| 3 | 11 | $45 \times 10^6$ | $4.6 \times 10^4$ | $1.1 \times 10^5$ |
| 4 | 15 | $9.5 \times 10^6$ | $1.1 \times 10^4$ | $1.6 \times 10^5$ |
| 5 | 17 | $16 \times 10^6$ | $5.5 \times 10^4$ | $7.3 \times 10^5$ |
| 6 | 18 | $1.2 \times 10^6$ | $3.5 \times 10^4$ | $1.1 \times 10^6$ |

From the above table it appears that the milk supplied to the plant was of poor quality having a bacteria count of 1.0 45 millions per ml. In spite of that, the bacteria count of the milk leaving the scrubber did not reach the same level until after 18 hours of operation of the plant.

It should be understood that various modifications and changes of the embodiments shown in the drawings may be made within the scope of the invention. It should also be pointed out that the apparatus or plant according to the invention is not only advantageous in connection with drying of milk, whey, and similar milk products, but may also be used for spray drying of other perishable liquid products such as fruit juices.

We claim:

1. A method of spray drying a bacteria liable perishable solids containing liquid product comprising passing said liquid product along a flow path defined in a preheater of a multistage evaporator so as to heat said liquid product to a pasteurization temperature, concentrating said liquid product in said evaporator, spraying said concentrated liquid product having passed said evaporator into a spray drying chamber, supplying drying gas into said spray drying chamber, passing exhaust gas phase from said spray drying chamber into a gas scrubber to remove solid particles from said gas phase, deriving at least part of said pasteurized liquid product from the flow path of said evaporator at a first location and immediately thereafter passing it into said gas scrubber where it is used as washing liquid prior to spraying said liquid product part into said spray drying chamber, cooling said heated liquid product part in a heat exchanger prior to passing it into said gas scrubber from said evaporator, and returning said washing liquid from said gas scrubber to the flow path of said evaporator at a second location adjacent to said first location and at substantially the same temperature as that at which said washing liquid is removed from said flow path of the evaporator, said washing liquid being returned from said gas scrubber is heated in said heat exchanger by said heated liquid product part derived from said evaporator and being passed to said gas scrubber.

2. A method according to claim 1, wherein said perishable liquid product is a milk product.

3. A method according to claim 2, wherein said milk product is skim milk.

4. A method according to claim 2, wherein said milk product is whey.

5. A method according to claim 1, wherein said liquid product part to be used as gas washing liquid is at least partly heated by injecting hot steam thereinto.

6. In a method of spray drying a bacteria liable perishable, solids containing liquid product, wherein said liquid product is sprayed into a spray drying chamber to which drying gas is simultaneously supplied while exhaust gas phase is passed from said spray drying chamber into a gas scrubber, in which at least part of said liquid product being heated to a pasteurization temperature and immediately thereafter introduced and used as gas washing liquid before spraying said liquid product into said spray drying chamber, the improvement comprising passing said liquid milk product along a flow path defined in an evaporator so as to heat said liquid product to a pasteurization temperature, concentrating said liquid milk product in said evaporator prior to spraying it into said spray drying chamber, said gas washing liquid being derived from the flow path of said evaporator and removed therefrom at a first location of said flow path, cooling said heated liquid product part in a heat exchanger upstream of said gas scrubber, and returning said washing liquid from said gas scrubber to said evaporator at a second location of said flow path adjacent to said first location and at substantially the same temperature as that at which said washing liquid is removed from said evaporator at said first location.

7. A method according to claim 6, wherein said perishable liquid product is a milk product.

8. A method according to claim 6, wherein said washing liquid being returned from said gas scrubber is heated in said heat exchanger by said heated liquid product part being passed to said gas scrubber.

9. A method according to claim 6, wherein said liquid product part to be used as a gas washing liquid is at least partly heated by injecting steam thereinto.

10. A method according to claim 9, wherein said heated liquid product part is cooled in said heat exchanger by means of fresh, cool liquid milk product to be treated.

* * * * *